(12) United States Patent
Kuan et al.

(10) Patent No.: US 7,029,075 B2
(45) Date of Patent: Apr. 18, 2006

(54) BICYCLE HUB SEALING ASSEMBLY

(75) Inventors: Kim Hong Kuan, Johor Darul Takzim (MY); Takanori Kanehisa, Osaka (JP)

(73) Assignee: Shimano Inc., Osaka (JP)

( * ) Notice: Subject to any disclaimer, the term of this patent is extended or adjusted under 35 U.S.C. 154(b) by 149 days.

(21) Appl. No.: 10/781,934

(22) Filed: Feb. 20, 2004

(65) Prior Publication Data

US 2005/0184580 A1    Aug. 25, 2005

(51) Int. Cl.
   *B60B 27/00* (2006.01)
(52) U.S. Cl. .................................. 301/110.5
(58) Field of Classification Search ............ 301/110.5, 301/110.6, 59; 192/64
   See application file for complete search history.

(56) References Cited

U.S. PATENT DOCUMENTS

| | | | |
|---|---|---|---|
| 4,580,670 A | | 4/1986 | Nagano |
| 5,531,510 A | * | 7/1996 | Yamane ................... 301/110.5 |
| 6,202,813 B1 | | 3/2001 | Yahata et al. |
| 6,322,155 B1 | * | 11/2001 | Chen ........................ 301/110.5 |
| 6,352,314 B1 | * | 3/2002 | Tabe ........................ 301/110.5 |
| 6,386,644 B1 | | 5/2002 | Chen |
| 6,511,133 B1 | * | 1/2003 | Tabe ........................... 301/59 |
| 6,588,564 B1 | | 7/2003 | Jager et al. |
| 2003/0042101 A1 | | 3/2003 | Juan |
| 2004/0140709 A1 | * | 7/2004 | Kanehisa ................. 301/110.5 |

FOREIGN PATENT DOCUMENTS

| | | |
|---|---|---|
| DE | 19856626 A1 | 6/2000 |
| DE | 20013400 U1 | 1/2001 |
| DE | 20101377 U1 | 5/2001 |
| JP | 63-169303 U | 11/1988 |
| JP | 2593889 Y2 | 2/1999 |
| JP | 3460166 B2 | 8/2003 |
| WO | WO 00/34056 A1 | 6/2000 |

\* cited by examiner

*Primary Examiner*—Russell D. Stormer
(74) *Attorney, Agent, or Firm*—Shinjyu Global IP Counselors (57) ABSTRACT

A bicycle sealing assembly is provided for a bicycle part having a fixed part and a rotational part mounted to rotate relative to the fixed part such as a bicycle hub. The rotatable member (hub shell and/or freewheel) is rotatable mounted on the fixed part (hub axle assembly) by a pair of bearing assemblies. The sealing assembly basically has first and second dust caps and first and second sealing members. The first dust cap is coupled to the rotatable member, while the second dust cap coupled to the hub axle. The first sealing member is disposed between the first dust cap and either the fixed part or the second dust cap to form a seal therebetween. The second sealing member is disposed between the second dust cap and either the first dust cap or the rotational part to form a seal therebetween.

40 Claims, 11 Drawing Sheets

BICYCLE HUB SEALING ASSEMBLY

BACKGROUND OF THE INVENTION

1. Field of the Invention

The present invention relates to a bicycle sealing assembly for a bicycle part. More specifically, present invention relates to a bicycle sealing assembly for use between a fixed part and a rotational part that is coaxially mounted relative to the fixed part. The present invention is especially useful in a hub bicycle that is mounted to a bicycle frame.

2. Background Information

Bicycling is becoming an increasingly more popular form of recreation as well as a means of transportation. Moreover, bicycling has become a very popular competitive sport for both amateurs and professionals. Whether the bicycle is used for recreation, transportation or competition, the bicycle industry is constantly improving the various components of the bicycle as well. One component that has been extensively redesigned is the hub of the bicycle.

The hubs of bicycles are located in an area of the bicycle that is subjected to dust, dirt and other contaminates. Thus, it is necessary to construct the hub such that its performance is not compromised due to dust, dirt and other contaminates. Generally, bicycle hubs have a hub shaft or axle mounted in a non-rotatable manner to a rear part of the bicycle frame and a hub shell mounted in a rotatable manner to the hub axle by a pair of bearing assemblies. In the case of some rear hubs, one side of the hub is provided with a drive body or driving cylinder that is mounted in a freely rotatable manner to one end of the hub shell, and a one-way clutch arranged between the driving cylinder and the hub shell to transmit rotation from the driving cylinder to the hub shell in one direction. The driving cylinder is configured and arranged to have a plurality of sprockets mounted to a radially outward-facing surface of the driving cylinder such that the sprockets can neither rotate nor move axially with respect to the driving cylinder.

In these conventional arrangements just described, the ends of the hubs are provided with a pair of dust caps to limit dust, dirt and other contaminates from entering into the interior of the hub. For example, a hub that uses a sealing arrangement having a pair of dust caps is disclosed in U.S. Pat. No. 6,202,813. While this sealing arrangement works well, sometimes dust dirt and other contaminates can still enter the interior of the hub.

In view of the above, it will be apparent to those skilled in the art from this disclosure that there exists a need for an improved bicycle sealing assembly. This invention addresses this need in the art as well as other needs, which will become apparent to those skilled in the art from this disclosure.

SUMMARY OF THE INVENTION

Regarding bicycle sealing assemblies, one object of the present invention is to improve the seal created between a fixed bicycle part and a rotational bicycle part that is mounted to rotate relative the fixed bicycle part.

In accordance with one aspect of the present invention, a bicycle sealing assembly is provided for a bicycle part. The bicycle sealing assembly includes a first dust cap, a second dust cap, a first sealing member and a second sealing member. The first dust cap is coupled to the first rotatable end of the rotatable hub member. The second dust cap is coupled to the first axle end of the hub axle. The first sealing member is disposed between the first dust cap and the fixed part or the second dust cap to form a first seal therebetween. The second sealing member is disposed between the second dust cap and either the first dust cap or the rotational part to form a second seal therebetween.

In accordance with another aspect of the present invention, a bicycle component is provided that is mounted to a part of a bicycle. The bicycle component comprising a fixed part, a rotatable part and a sealing assembly. The fixed part has a center axis. The rotatable part has an inner tubular surface forming a central passage. The fixed part is rotatably disposed within the central passage of the rotatable part. The sealing assembly is disposed between the fixed part and the rotatable part. The sealing assembly includes a first dust cap, a second dust cap, a first sealing member and a second sealing member. The first dust cap is coupled to the rotatable part. The second dust cap is coupled to the fixed part. The first sealing member is disposed between the first dust cap and either the fixed part or the second dust cap to form a first seal therebetween. The second sealing member is disposed between the second dust cap and either the first dust cap or the rotatable part to form a second seal therebetween.

These and other objects, features, aspects and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure.

DETAILED DESCRIPTION OF THE PREFERRED EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

Figure 1:
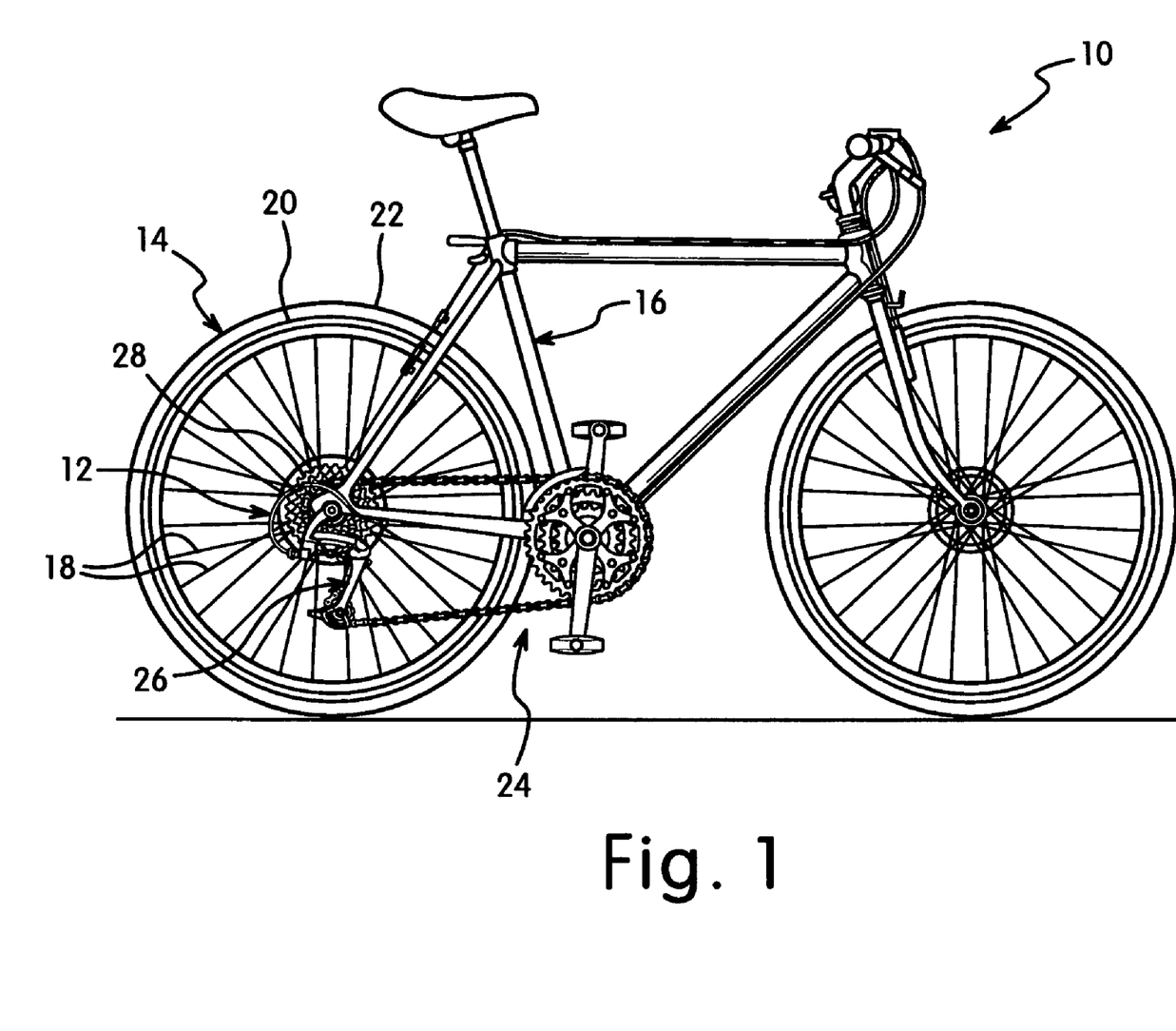
FIG. 1 is a side elevational view of a bicycle equipped with a rear hub that is equipped with a pair of bicycle hub sealing assemblies in accordance with a first embodiment of the present invention.

Referring initially to FIG. 1, a bicycle 10 is illustrated that is equipped with a rear hub 12 in accordance with one embodiment of the present invention. While the present invention will be illustrated in the rear hub 12, it will be apparent to those skilled in art from this disclosure that the present invention can be used in other bicycle components such as a front hub, a bottom bracket, etc. The rear bicycle hub 12 is part of a rear wheel 14 that is rotatably coupled to a rear fork section of a bicycle frame 16. In particular, the rear wheel 14 has a plurality of spokes 18 extending outwardly the rear bicycle hub 12 to an annular rim 20 by spoke nipples (not shown). A pneumatic tire 22 is mounted on the outer surface of the rim 20 in a conventional manner. The bicycle 10 also includes a drive train 24 for propelling the bicycle 10. The drive train 24 includes a rear derailleur 26 and a set of rear sprockets 28 that are mounted to the rear bicycle hub 12 as briefly explained below.

Since most of the parts of the bicycle 10 are well known in the art, the parts of the bicycle 10 will not be discussed or illustrated in detail herein, except for the parts relating to the rear bicycle hub 12 of the present invention. Moreover, various conventional bicycle parts such as brakes, shifters, drive train parts, derailleurs, additional sprocket, etc., which are not illustrated and/or discussed in detail herein, can also be used in conjunction with the present invention.

Figure 2:
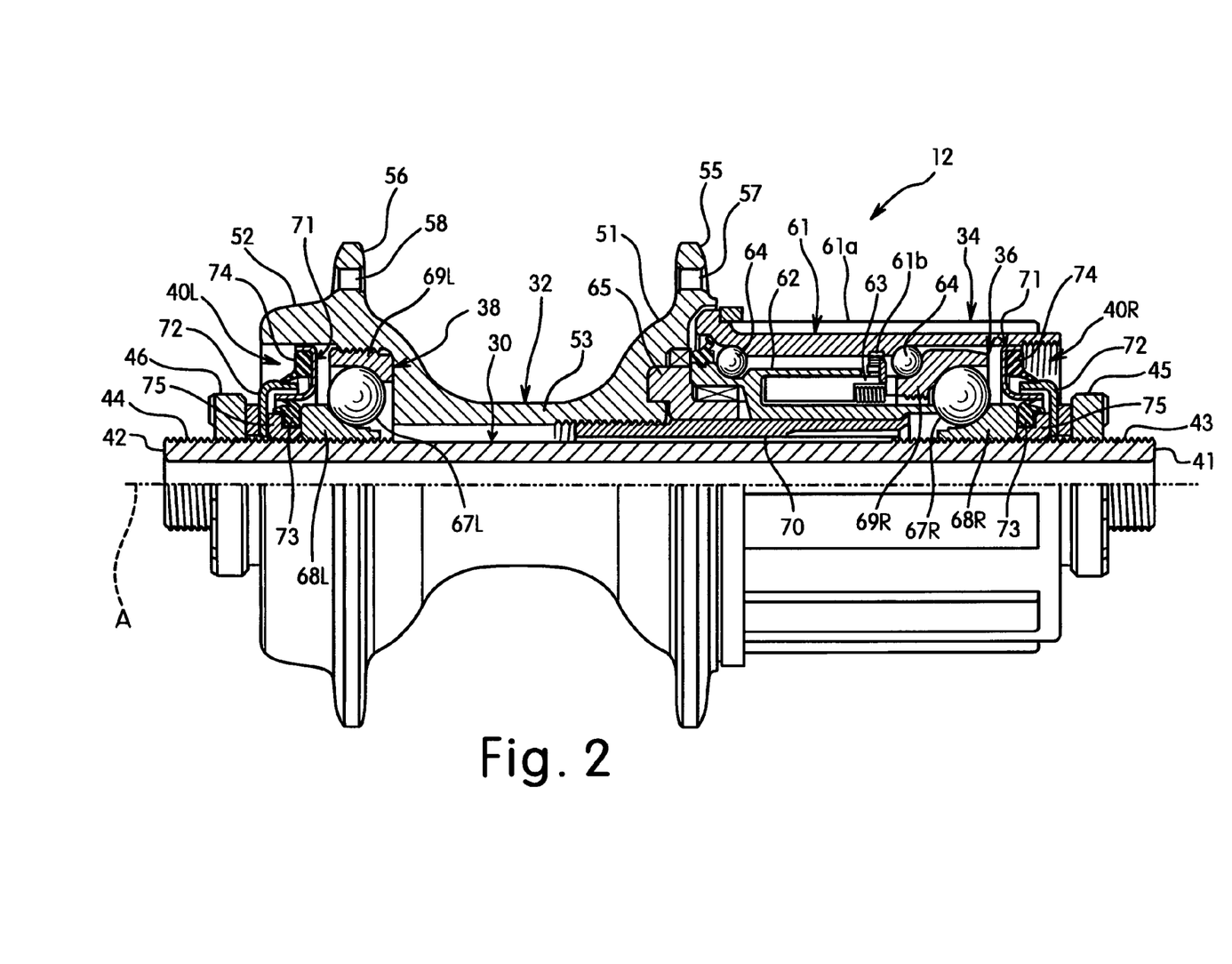
FIG. 2 is a partial cross sectional view of the rear hub illustrating the bicycle hub sealing assemblies disposed on each of the ends of the rear hub in accordance with the first embodiment of the present invention.

In the illustrated embodiment, the rear wheel 14 has thirty-two of the spokes 18 extending between the rear bicycle hub 12 and the rim 20. Of course, it will be apparent to those skilled in the art from this disclosure that the rear wheel 14 can have fewer or more of the spokes 18 than illustrated, if needed and/or desired. Each of the spokes 18 has an outer threaded end or spoke head coupled to the rim 20 by a spoke nipple and an inner bent end coupled to the rear bicycle hub 12 in a conventional manner. More specifically, the outer ends of the spokes 18 are threadedly coupled to the rim 20 by the spoke nipples to adjust the tension in the spokes 18.

The rim 20 is constructed of a substantially rigid material, such as those materials, which are well known in the art. For example, the rim 20 can be constructed of any suitable metallic material, such as plated steel, stainless steel, aluminum, magnesium or titanium, as well as other non-metallic materials, such as a carbon fiber composite, which can be utilized for a bicycle wheel. The rim 20 is relatively conventional. Therefore, the rim 20 will not be discussed or illustrated in detail herein.

As seen in FIG. 2, the bicycle hub assembly 12 basically includes a hub axle 30 and a hub shell 32 with a freewheel 34 for receiving the rear sprockets 28. The hub axle 30 and the various parts that are fixedly coupled to rotate with the hub axle 30 are collectively referred to herein as a fixed part of the bicycle component. The hub shell 32 and the freewheel 34 form a rotatable hub member (rotatable part) that is mounted on the hub axle 30 for rotation. In particular, the rotatable hub member (the hub shell 32 and the freewheel 34) is rotatably mounted on the hub axle 30 by a pair of bearing assemblies 36 and 38. As explained below, the freewheel 34 includes a one-way clutch that limits rotation of the hub shell 32 to one rotational direction relative to the hub axle 30.

The ends of the bicycle hub assembly 12 are sealed by a pair of bicycle sealing assemblies 40R and 40L that are disposed between the hub axle 30 and the rotatable hub member (the hub shell 32 and the freewheel 34). The bicycle sealing assembly 40R is disposed between the hub axle 30 and the freewheel 34 that forms a first rotatable end of the rotatable hub member (the hub shell 32 and the freewheel 34). The bicycle sealing assembly 40L is disposed between the hub axle 30 and the hub shell 32 that forms a second rotatable end of the rotatable hub member (the hub shell 32 and the freewheel 34).

The hub axle 30 is a hard, rigid tubular member that has a first or right axle end 41 and a second or left axle end 42 with a center axis A extending between the first and second axle ends 41 and 42. The first axle end 41 is provided with external threads 43, while the second axle end 42 is provided with external threads 44. A first locking nut 45 is threaded on to the external threads 43 of the first axle end 41, while a second locking nut 46 is threaded on to the external threads 44 of the second axle end 42.

Preferably, the hub shell 32 is preferably formed as a one-piece, unitary member. It will be apparent to those skilled in the art that the hub shell 32 can be constructed of any substantially rigid material, such as those materials, which are known in the art. For example, the hub shell 32 can be constructed of any suitable metallic material, such as plated steel, stainless steel, aluminum, magnesium or titanium, as well as other non-metallic materials, such as carbon fiber composite, ceramic or plastic. Of course, the hub shell 32 could be constructed of several pieces of various different materials as need and/or desired.

Still referring to FIG. 2, the hub shell 32 has a first or right shell end 51 and a second or left shell end 52 with a center tubular portion 53 located therebetween. The first and second hub shell ends 51 and 52 are integral formed with the center tubular portion 53 as a one-piece, unitary member. The hub shell 32 is a tubular member having an inner tubular surface forming a central interior passage extending between the first and second shell ends 51 and 52. The hub axle 30 is coaxially disposed within the central passage of the hub shell 32. The first and second bearing 36 and 38 rotatably support the hub shell 32 on the hub axle 30 for rotating the hub shell 32 relative to the hub axle 30.

The first shell end 51 has a first spoke attachment portion or flange 55 with the freewheel 34 operatively coupled thereto. The second shell end 52 has a second spoke attachment portion or flange 56. Thus, the rim 20 is coupled to the first and second spoke flanges 55 and 56 via the spokes 18. The first spoke flange 55 is preferably an annular member with a plurality of first spoke holes 57 (e.g., sixteen in the illustrated embodiment but only one shown in FIG. 2). In this embodiment, the first spoke holes are equally spaced apart about the imaginary circle that is centered on the axis A. The first spoke holes 57 are arranged to receiving the bent ends of the spokes 18. Similarly, the second spoke flange 56 is preferably an annular member with a plurality of second spoke holes 58 for receiving the bent ends of the spokes 18. In the illustrated embodiment, the second spoke holes 58 are equally spaced apart about the imaginary circle that is centered on the center axis A of the hub axle 30.

Referring again to FIG. 3, the freewheel 34 is operatively coupled between the first axle end 41 of the hub axle 30 and the first shell end 51 of the hub shell 32. The freewheel 34 basically includes of a driving (outer) cylinder 61, a driven (inner) cylinder 62, a plurality of spring biased pawls 63, two sets of ball bearings 64 that are axially spaced apart, and a serration main body 65. The freewheel 34 is relatively conventional, and thus, will not be discussed or illustrated in detail herein. For example, the freewheel 34 of the illustrated embodiment is constructed in accordance with U.S. Pat. No. 6,202,813 that is assigned to Shimano, Inc. The freewheel 34 is coupled to the hub shell 32 in a relatively conventional manner as will be briefly explained below. The sprockets 28 are mounted on the freewheel 34 in a relatively conventional manner such that rotation of the sprockets 28 results in rotation of the freewheel 34. Rotation of the freewheel 34 relative to the hub axle 30 in turn rotates the hub shell 32.

Figure 3:
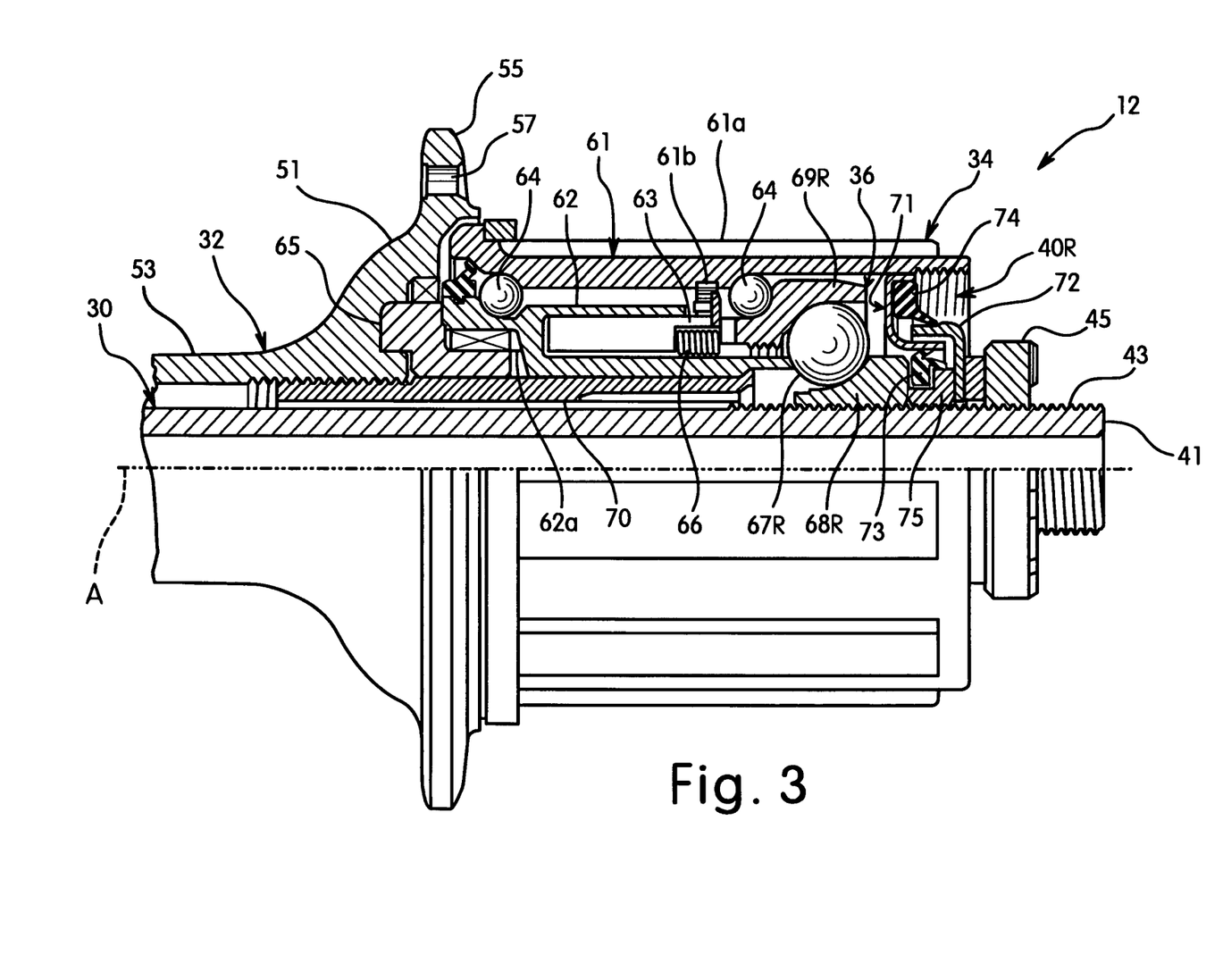
FIG. 3 is an enlarged partial cross sectional view of the right-hand portion of the rear hub illustrated in FIG. 2 with the right-hand bicycle hub sealing assembly in accordance with the first embodiment of the present invention.
Figure 4:
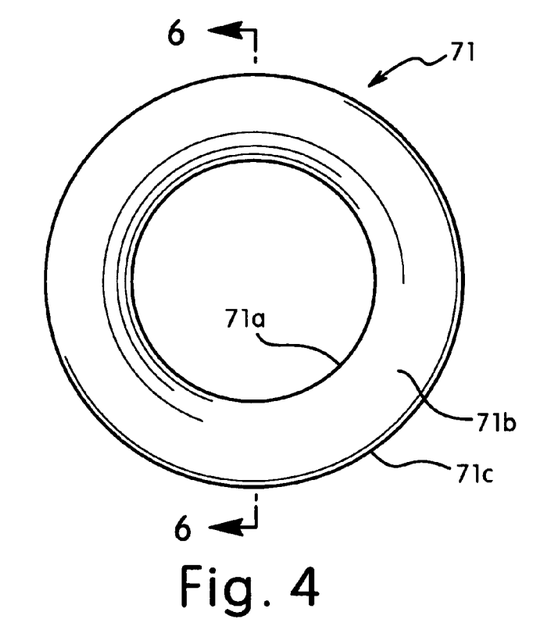
FIG. 4 is a left axial end elevational view of the outer dust cap for the bicycle hub sealing assemblies illustrated in FIGS. 2 and 3 in accordance with the first embodiment of the present invention.
Figure 5:
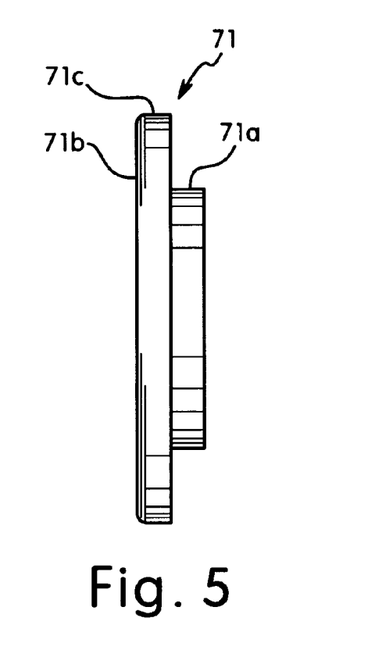
FIG. 5 is a side elevational view of the outer dust cap illustrated in FIG. 4 in accordance with the first embodiment of the present invention.
Figure 6:
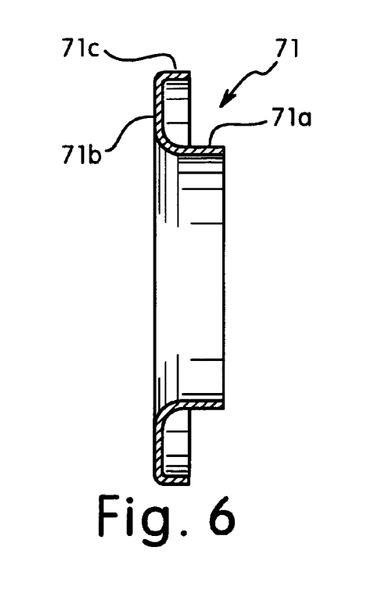
FIG. 6 is a cross sectional view of the outer dust cap illustrated in FIGS. 4 and 5 as seen along section line 6—6 of FIG. 4.

The driving (outer) cylinder 61 is a tubular member having a roughly cylindrical shape. The free end portion of the driving (outer) cylinder 61 forms the first rotatable end of the rotatable hub member (the hub shell 32 and the freewheel 34). The outer peripheral surface of the driving (outer) cylinder 61 is provided with a plurality of axially extending splines 61a for fixedly attaching the sprockets 28. In other words, the splines 61a non-rotatably couple the sprockets 28 to the outer peripheral surface of the driving cylinder 61. Thus, the sprockets 28 are mounted to the driving cylinder 61 for transmitting torque to the hub shell 32 via the unidirectional rotation transmission mechanism of the free wheel 34. The inner peripheral surface of the interior opening of the driving cylinder 61 has a plurality of ratchet teeth 61b that forms a first part of the unidirectional rotation transmission mechanism of the freewheel 34. The inner peripheral surface of the driving cylinder 61 is also rotatably supported on the driven (inner) cylinder 62 by the ball bearings 64.

The driven (inner) cylinder 62 is inserted and disposed coaxially about the hub axle 30 and coaxially within the driving (outer) cylinder 61. The driven (inner) cylinder 62 is fixed to the hub shell 32 by the serration main body 65, which is fixed to the hub sell 32 by interlocking serrations. In particular, the driven (inner) cylinder 62 has an inner peripheral surface with serrated teeth 62a that are interlocked with external serrations of the serration main body 65. Thus, the driven (inner) cylinder 62 rotates with the hub shell 32.

The driven (inner) cylinder 62 is designed to hold the pawls 63 in such a manner as explained, for example, in U.S. Pat. No. 6,202,813. Each of the pawls 63 is pivotally mounted on the driven (inner) cylinder 62 and biased to an extended position by a coil torsion spring 66 such that the pawls 63 normally engage the ratchet teeth 61b of the driving (outer) cylinder 61. The pawls 63 and the springs 66 are configured and arranged to operatively couple the driving (outer) cylinder 61 to the driven (inner) cylinder 62 when rotated in a first rotational direction and disconnect the driving (outer) cylinder 61 from the driven (inner) cylinder 62 when rotated in a second rotational direction that is opposite the first rotational direction. In other words, ratchet teeth 61b together with the pawls 63 and the springs 66 form a unidirectional rotation transmission or one-way clutch that is operatively coupled between the driving cylinder 61 and the driven cylinder 62. Accordingly, the driven (inner) cylinder 62 is adapted, by means of the unidirectional rotation transmission mechanism and the ball bearings 64, to freely rotate in one direction relative to the driving cylinder 61.

Since bearing assemblies, similar to the bearing assemblies 36 and 38, are well known in the bicycle art, the bearing assemblies 36 and 38 will not be discussed or illustrated in detail herein. The first or right hand bearing assembly 36 is disposed between the first axle end 41 of the hub axle 30 and the freewheel 34 (part of the rotatable hub member) to rotatably support the first shell end 51 of the hub shell 32 and the freewheel 34 on the first axle end 41 of the hub axle 30.

As seen in FIGS. 2 and 3, the first or right hand bearing assembly 36 preferably includes a plurality of first rolling members or balls 67R disposed between a first inner race or cone 68R threadedly coupled to the first axle end 41 of the hub axle 30 and a first outer race or cone 69R threadedly coupled to the driven (inner) cylinder 62 that is fixed to the hub shell 32. The first inner cone 68R includes a first inner angular bearing surface contacting one axial side of the first rolling members 67R such that first inner cone 68R contacts and supports each of the first rolling members 67R at an inner peripheral area. The first outer race 69R includes a first outer angular bearing surface contacting the first rolling members 67R on an axial side that is opposite from the first inner angular bearing surface such that the first outer race 69R contacts and supports each of the first rolling members 67R at an outer peripheral area.

As seen in FIG. 2, the second or left hand bearing assembly 38 is disposed between the second axle end 42 of the hub axle 30 and the second shell end 52 of the hub shell 32 to rotatably support the hub shell 32 on the second axle end 42 of the hub axle 30. The second or left hand bearing assembly 38 preferably includes a plurality of second rolling members or balls 67L disposed between a second inner race or cone 68L threadedly coupled to the second axle end 42 of the hub axle 30 and a second outer race or cone 69L threadedly coupled to the interior of the second shell end 52 of the hub shell 32.

As seen in FIG. 2, the second inner cone 68L includes a second inner angular bearing surface contacting one axial side of the first rolling members 67L such that the second inner cone 68L contacts and supports each of the first rolling members 67L at an inner peripheral area. The second outer race 69L includes a second outer angular bearing surface contacting the first rolling members 67L on an axial side that is opposite from the second inner angular bearing surface such that the second outer race 69L contacts and supports each of the second rolling members 67L at an outer peripheral area.

The bicycle hub sealing assemblies 40R and 40L are mirror images of each other. In other words, the bicycle hub sealing assemblies 40R and 40L include the same parts, but are installed in the opposite direction. Thus, the same reference numerals will be used for the identical parts of the bicycle hub sealing assemblies 40R and 40L. The bicycle hub sealing assembly 40R is disposed between the first axle end 41 of the hub axle 30 and the first rotatable end of the driving (outer) cylinder 61, which constitutes part of the rotatable hub member. The bicycle hub sealing assembly 40L is disposed between the second axle end 42 of the hub axle 30 and the second hub shell end 52 of the hub shell 32, which constitutes part of the rotatable hub member. Each of the bicycle hub sealing assemblies 40R and 40L includes a first (outer) dust cap 71, a second (inner) dust cap 72, a first (inner) sealing member 73, a second (outer) sealing member 74, and a seal base nut 75.

Figure 7:
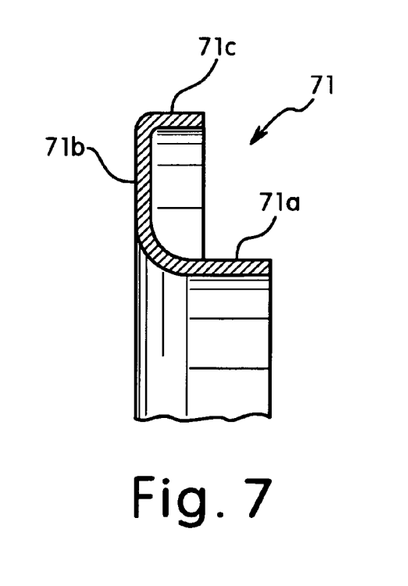
FIG. 7 is an enlarged partial cross sectional view of the outer dust cap illustrated in FIGS. 4–6 in accordance with the first embodiment of the present invention.
Figure 8:
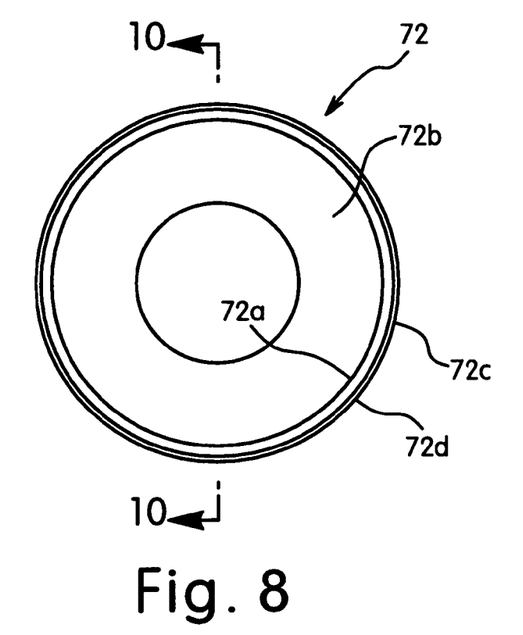
FIG. 8 is a left axial end elevational view of the inner dust cap for the bicycle hub sealing assemblies illustrated in FIGS. 2 and 3 in accordance with the present invention.
Figure 9:
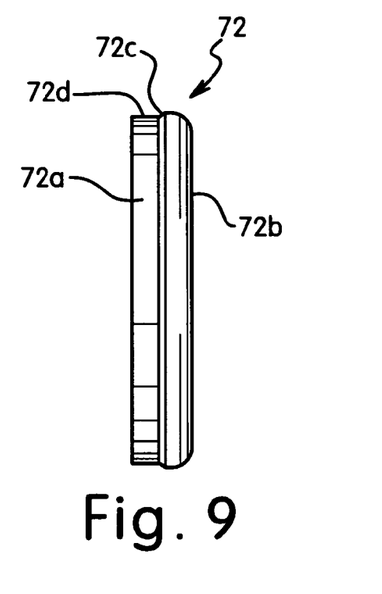
FIG. 9 is a side elevational view of the inner dust cap illustrated in FIG. 8 in accordance with the present invention.
Figure 10:
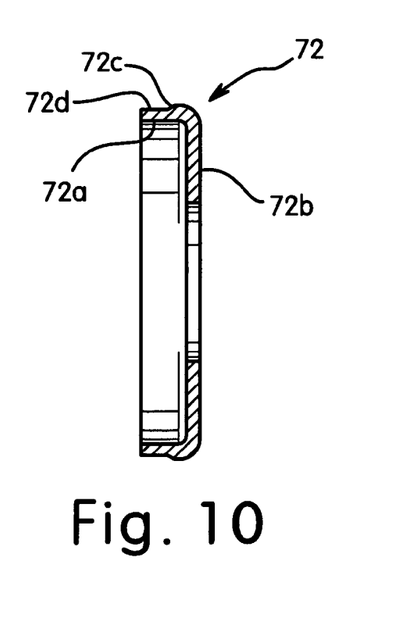
FIG. 10 is a cross sectional view of the inner dust cap illustrated in FIGS. 8 and 9 as seen along section line 10—10 of FIG. 8.

Referring now to FIGS. 2 and 4–7, the first (outer) dust cap 71 that is located on the right hand side of the hub 12 is fixedly coupled to the first rotatable end of the driving (outer) cylinder 61 (part of the rotatable hub member), while the first (outer) dust cap 71 that is located on the left hand side of the hub 12 is fixedly coupled to the hub shell end 52 of the hub shell 32. The first (outer) dust caps 71 are press fitted to the driving (outer) cylinder 61 and the hub shell 32 so that that rotate therewith. Each first dust cap 71 is a one-piece, unitary member made of a rigid sheet metal material having a small degree of flexibility. Preferably, the first dust caps 71 are an annular ring shaped members with a uniform cross-sectional profile. In other words, the cross section of the first dust cap 71 at any point preferably has the same cross section as seen in FIG. 7.

As seen in FIG. 7, each of the first dust caps 71 basically has a C-shaped cross section that includes an inner axial portion 71a, a middle radial portion 71b and an outer axial portion 71c. The inner axial portion 71a is a tubular portion that extends in a generally axial direction. The middle radial portion 71b is an annular ring shaped portion that extends in a generally radial direction between the inner axial portion 71a and the outer axial portion 71c. The outer axial portion 71c is a tubular portion that extends in a generally axial direction and directly contacts the inner peripheral surface of the driving cylinder 61. Thus, the first dust cap 71 rotates with the freewheel 34.

As seen in FIG. 2, the inner axial portion 71a of the first dust cap 71 is configured and arranged to overlap with the second dust cap 73 as explained below. The inner axial portion 71a of the first dust cap 71 has a radially inwardly facing that contacts the first (inner) sealing member 73 to create a seal therebetween. The outer axial portion 71c of the first dust cap 71 has a radially inwardly facing that contacts the second (outer) sealing member 73 to create a seal therebetween.

Figure 11:
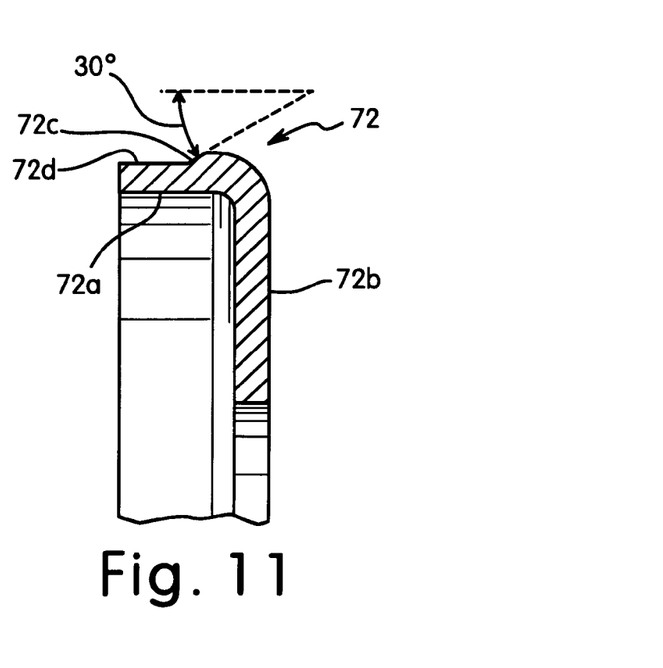
FIG. 11 is an enlarged partial cross sectional view of the inner dust cap illustrated in FIGS. 8–10 in accordance with the present invention.
Figure 12:
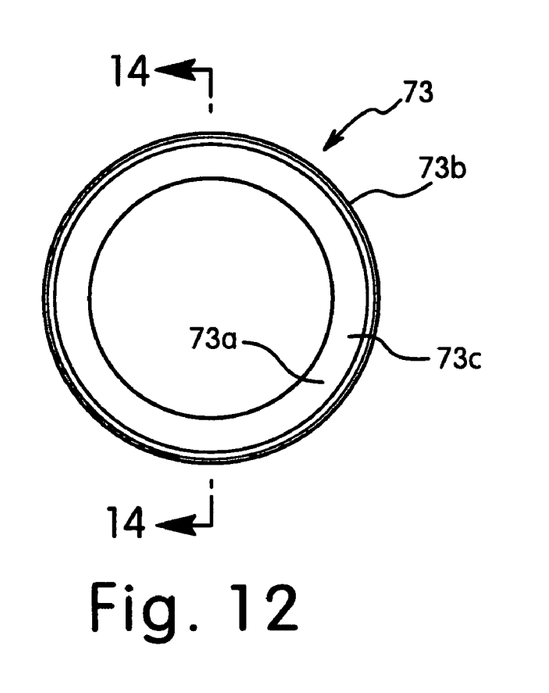
FIG. 12 is a left axial end elevational view of the inner sealing member for the bicycle hub sealing assemblies illustrated in FIGS. 2 and 3 in accordance with the present invention.
Figure 13:
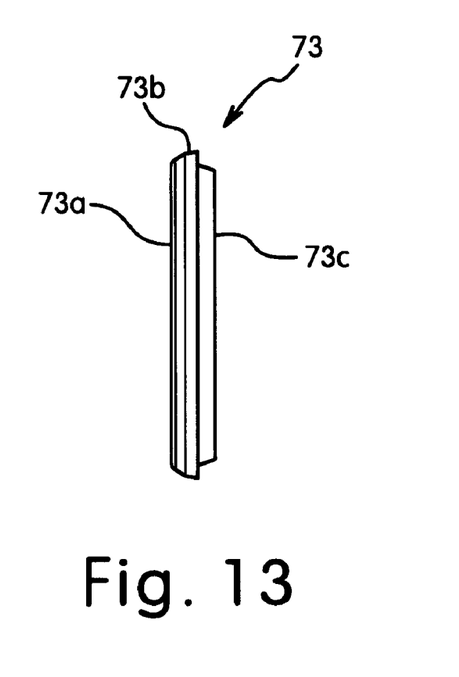
FIG. 13 is a side elevational view of the inner sealing member illustrated in FIG. 12 in accordance with the present invention.
Figure 14:
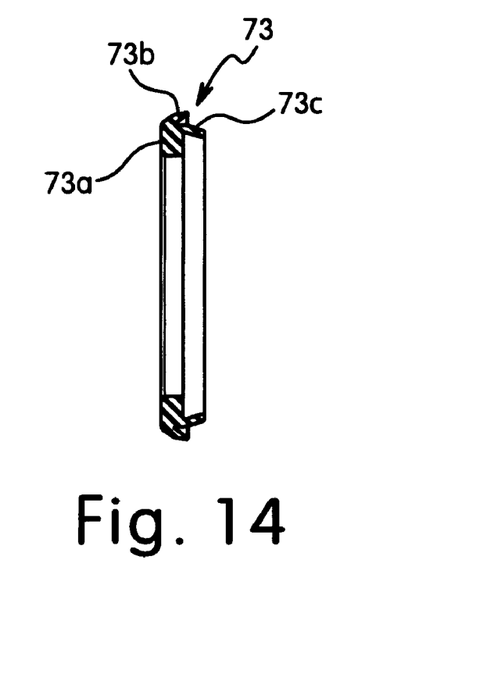
FIG. 14 is a cross sectional view of the inner sealing member illustrated in FIGS. 12 and 13 as seen along section line 14—14 of FIG. 12.

Referring now to FIGS. 2 and 8–11, the second (inner) dust caps 72 are fixedly coupled to the first and second axle ends 41 and 42 of the hub axle 30 by the first and second locking nuts 45 and 46 that are threaded onto the external threads 43 and 44 of the first and second axle ends 41 and 42, respectively. Thus, the second dust caps 72 rotate with the hub axle 30. The second dust caps 72 are a one-piece, unitary members made of a rigid sheet metal material having a small degree of flexibility. Preferably, each second dust cap 72 is an annular ring shaped member with a uniform cross-sectional profile. In other words, the cross section of the second dust cap 72 at any point preferably has the same cross section as seen in FIG. 11.

As seen in FIG. 11, each of the second dust caps 72 basically has an L-shaped cross section that includes an outer axial portion 72a and a radial portion 72b. The outer axial portion 72a is a tubular portion that extends in a generally axial direction. The radial portion 72b is an annular ring shaped portion that extends in a generally radial direction from one end of the outer axial portion 72a. At each end of the hub 12, the inner axial portion 71a of the first dust cap 71 is arranged to overlap with the outer axial portion 72a of the second dust cap 72. In particular, the inner axial portion 71a of the first dust cap 71 is arranged below the outer axial portion 72a of the second dust cap 72 as seen in FIG. 11.

The outer axial portion 72a of the second dust cap 72 has a radially outwardly facing surface that is stepped to form an annular abutment portion or surface 72c and a contact portion or surface 72d that contacts the second sealing member 74 to create a seal therebetween. The annular abutment portion 72c is configured and arranged to prevent axial movement of the second sealing member 74 along the contact surface 72d of the second dust cap 72. The abutment portion 72c is preferably an angled abutment surface that is angled approximately thirty degrees relative to a line parallel to the center axis A of the bicycle sealing assembly 40R.

Figure 15:
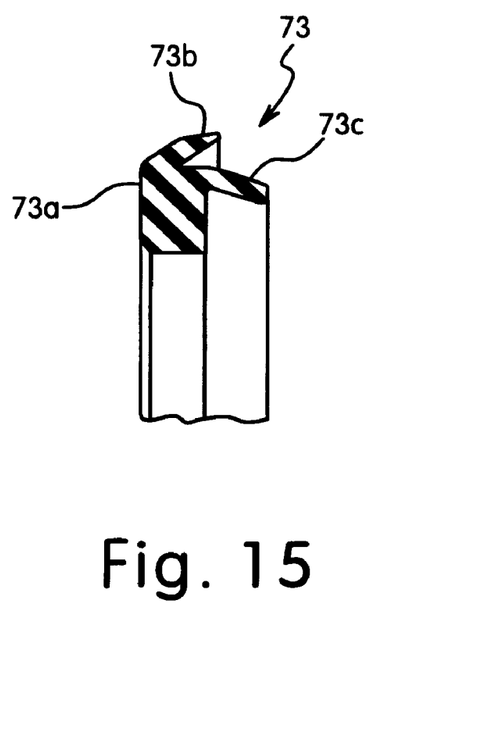
FIG. 15 is an enlarged partial cross sectional view of the inner sealing member illustrated in FIGS. 12–14 in accordance with the present invention.
Figure 16:
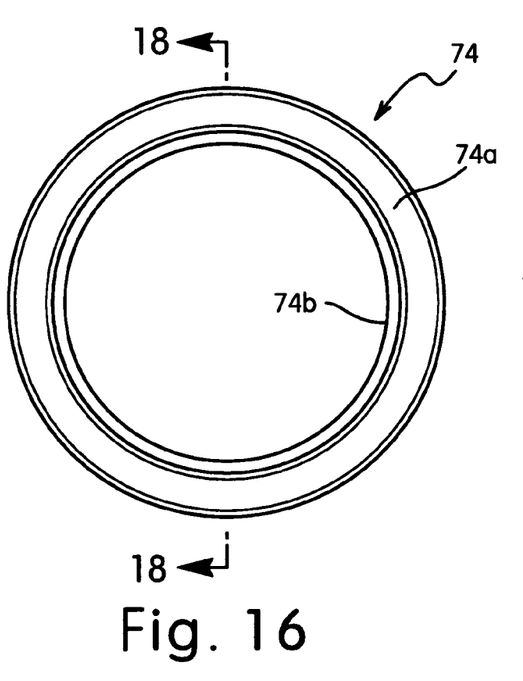
FIG. 16 is a left axial end elevational view of the outer sealing member for the bicycle hub sealing assemblies illustrated in FIGS. 2 and 3 in accordance with the present invention.
Figure 17:
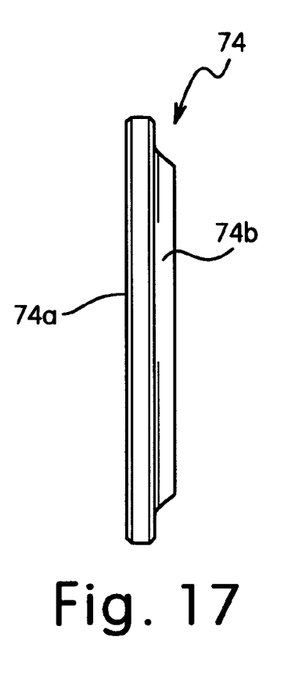
FIG. 17 is a side elevational view of the outer sealing member illustrated in FIG. 16 in accordance with the present invention.
Figure 18:
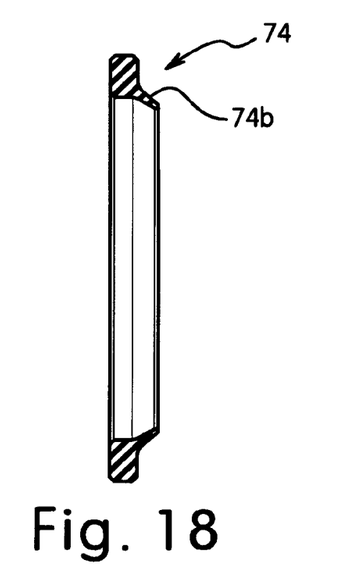
FIG. 18 is a cross sectional view of the outer sealing member illustrated in FIGS. 16 and 17 as seen along section line 18—18 of FIG. 16.

Referring now to FIGS. 2 and 12–15, each of the first (inner) sealing members 73 is slideably disposed between a corresponding one of the first dust caps 71 (rotational part) and a corresponding one of the seal base nuts 75 (fixed part). Of course, the first sealing members 73 can be configured and arranged to contact either the seal base nut 75 or the second dust cap 72 to form a seal therebetween. Each first sealing member 73 is a one-piece, unitary member made of a resilient flexible sealing material such as an elastomeric material having good sealing qualities. Preferably, the first sealing members 73 are an annular ring shaped member with a uniform cross-sectional profile. In other words, the cross section of each first sealing member 73 at any point preferably has the same cross section as seen in FIG. 15.

As seen in FIG. 15, each of the first sealing members 73 has a cross sectional shape that includes a main body portion 73a, an outer sealing flange portion 73b and an inner sealing flange portion 73c. The outer sealing flange portion 73b has an outer seal surface that directly contacts the radially inwardly facing surface of the inner axial portion 71a of the first dust cap 71 to form a seal therebetween. The inner sealing flange portion 73c has an inner seal surface that directly contacts the radially outwardly facing surface of the seal base nut 75 (fixed part) to form a seal therebetween. Preferably, the first sealing member 73 is configured and arranged relative to the first dust cap 71, the seal base nut 75 (fixed part) and the second dust cap 72 to float in an axial direction.

Figure 19:
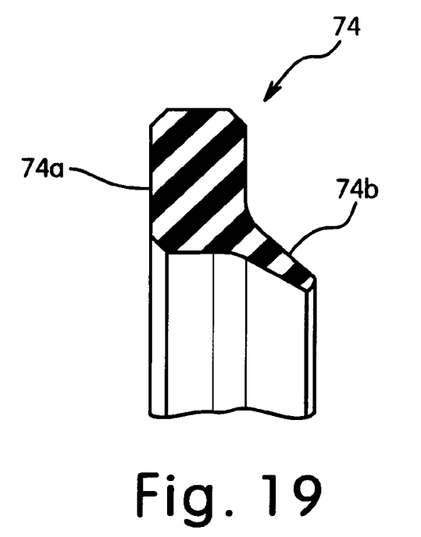
FIG. 19 is an enlarged partial cross sectional view of the outer sealing member illustrated in FIGS. 16–18 in accordance with the present invention.

Referring now to FIGS. 2 and 16–19, the second (outer) sealing members 74 are disposed between a corresponding one of the second dust caps 72 (fixed part) and a corresponding one of the first dust caps 71 (rotational part) to form a second seal therebetween. Of course, the second sealing member 74 can be configured and arranged to contact either the first dust cap 71 or the driving cylinder 61 to form a seal therebetween. The second sealing member 74 is a one-piece, unitary member made of a resilient flexible sealing material such as an elastomeric material having good sealing qualities. Preferably, the second sealing member 74 is an annular ring shaped member with a uniform cross-sectional profile. In other words, the cross section of the second sealing member 74 at any point preferably has the same cross section as seen in FIG. 19.

As seen in FIG. 19, each of the second sealing members 74 has a cross sectional shape that includes a main body portion 74a with an inner sealing flange portion 74b. As seen in FIG. 2, the main body portion 74a of the second sealing member 74 is press fitted into the first dust cap 71 such that an outer seal surface of the main body portion 74a of the second sealing member 74 contacts the radially inwardly facing surface of the outer axial portion 71c of the first dust cap 71 to create a seal therebetween. The inner sealing flange portion 74b contacts a radially outwardly facing portion of the contact surface 72d of the second dust cap 72 such that an inner seal surface of the inner sealing flange portion 74b of the second sealing member 74 contacts the radially outwardly facing surface of the outer axial portion 72a of the second dust cap 72 to create a seal therebetween. The free end or tip of the inner sealing flange portion 74b contacts the annular abutment portion 72c to prevent axial movement of the second sealing member 74 along the contact surface 72d of the second dust cap 72.

As seen in FIGS. 2 and 3, the seal base nuts 75 are threaded on to the external threads 43 and 44 of the first and second axle ends 41 and 42. Each of the seal base nuts 75 has a step shaped outer peripheral surface for receiving the first sealing member 73 thereon. The step shaped outer peripheral surface of the seal base nut 75 is configured and arrange such that the first sealing member 73 can float relative in an axial direction relative to the first dust cap 71, the seal base nut 75 (fixed part) and the second dust cap 72.

Second Embodiment

Figure 20:
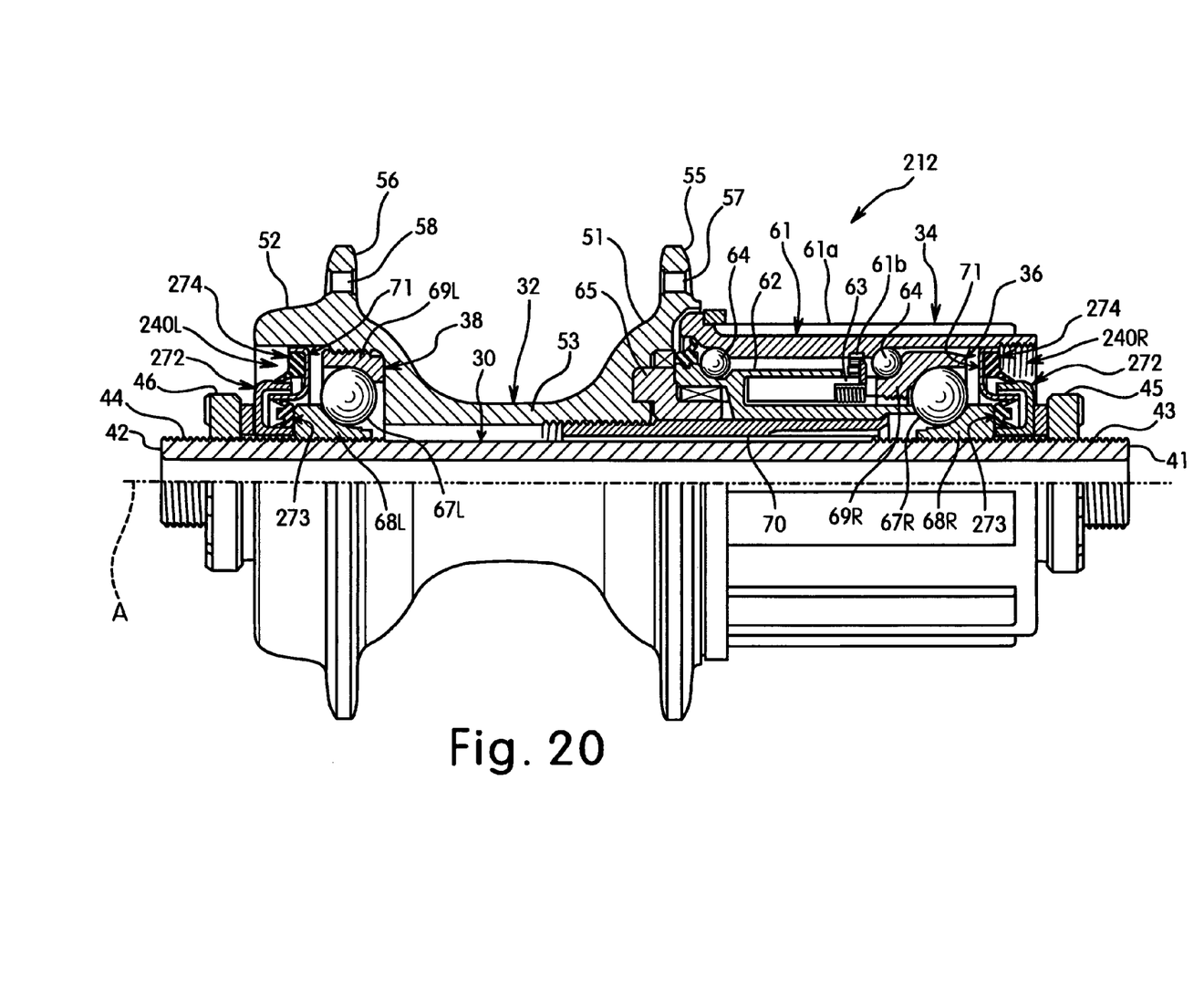
FIG. 20 is a partial cross sectional view of the rear hub illustrating with a modified bicycle hub sealing assembly disposed on each of the ends of the rear hub in accordance with a second embodiment of the present invention.
Figure 21:
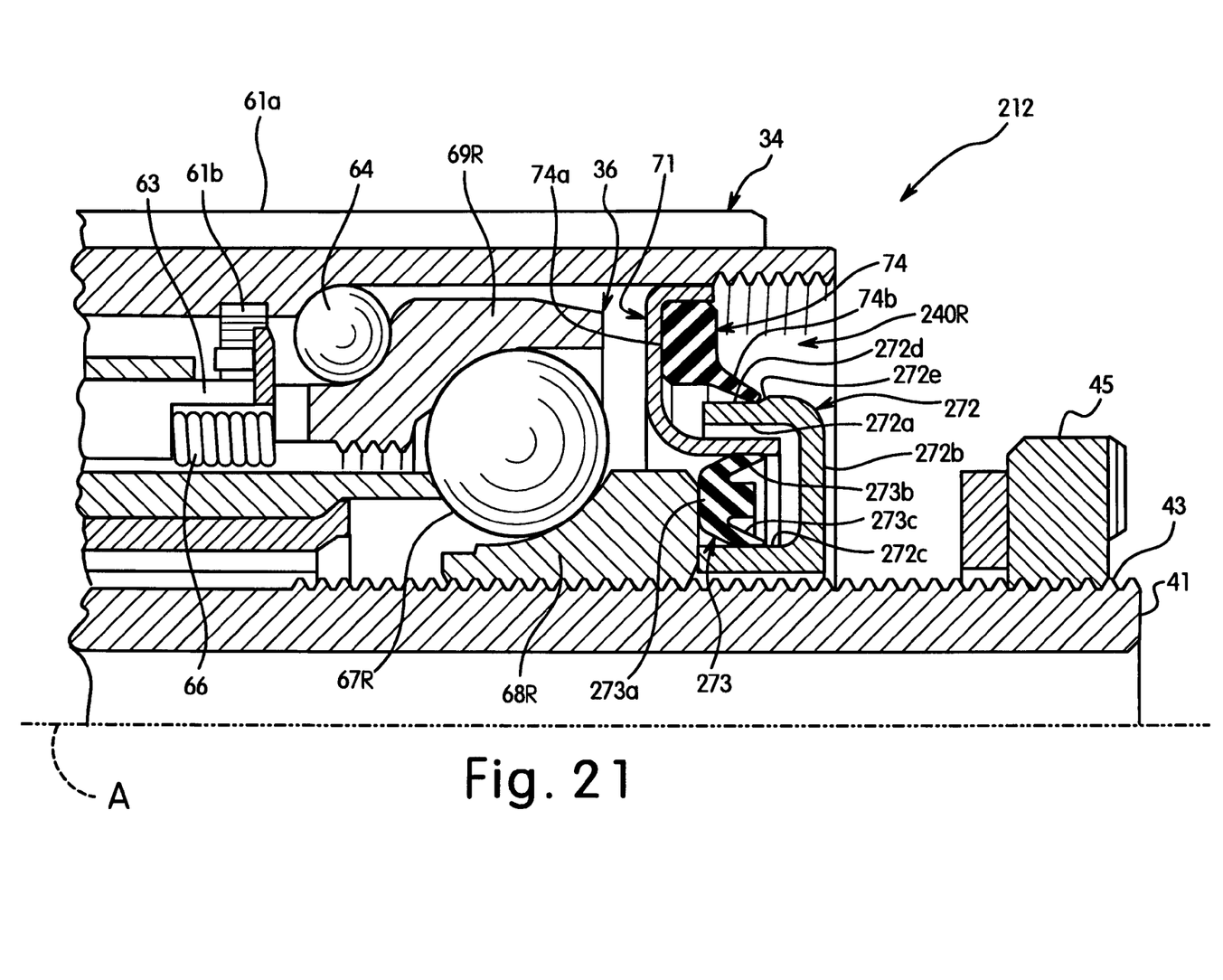
FIG. 21 is an enlarged partial cross sectional view of the right-hand portion of the rear hub illustrated in FIG. 20 with the locking nut partially unthreaded.

Referring now to FIGS. 20 and 21, a rear hub 212 is illustrated in accordance with a second embodiment. In view of the similarity between the first and second embodiments, the parts of the second embodiment that are identical to the parts of the first embodiment will be given the same reference numerals as the parts of the first embodiment. Moreover, the descriptions of the parts of the second embodiment that are identical to the parts of the first embodiment may be omitted for the sake of brevity.

Basically, the rear hub 212 is identical to the rear hub 12, except that the sealing assemblies 40R and 40L of the first embodiment have been replaced with a pair of modified sealing assemblies 240R and 240L in this second embodiment. More specifically, the seal base nuts 75 have been eliminated in the sealing assemblies 240R and 240L of the rear hub 212, and the dust caps 72 and the seals 73 have been each replaced with an inner dust cap 272 and an inner seal 273 in the rear hub 212. In other words, each of the sealing assemblies 240R and 240L of the rear hub 212 includes the first (outer) dust cap 71, the second (inner) dust cap 272, the first (inner) sealing member 273, and the second (outer) sealing member 74. Thus, in this embodiment, the inner seal 273 directly contacts the inner dust cap 272 and the outer dust cap 71 to create a seal therebetween.

As seen in FIG. 20, the inner dust caps 272 are fixedly coupled to the first and second axle ends 41 and 42 of the hub axle 30 by the first and second locking nuts 45 and 46 that are threaded onto the external threads 43 and 44 of the first and second axle ends 41 and 42, respectively. Thus, the inner dust caps 272 rotate with the hub axle 30. Each inner dust cap 272 is a one-piece, unitary member made of a rigid sheet metal material having a small degree of flexibility. Preferably, the inner dust caps 272 are an annular ring shaped member with a uniform cross-sectional profile. In other words, the cross section of the inner dust cap 272 at any point preferably has the same cross section. As seen in FIG. 21, the inner dust cap 272 basically has a C-shaped cross section that includes an outer axial portion 272a, a radial portion 272b and an inner axial portion 272c. The outer axial portion 272a is a tubular portion that extends in a generally axial direction. The radial portion 272b is an annular ring shaped portion that extends in a generally radial direction from between the outer axial portion 272a and the inner axial portion 272c. The inner axial portion 71a of the outer dust cap 71 is arranged to overlap with the outer axial portion 272a of the second dust cap 272. In particular, the inner axial portion 71a of the outer dust cap 71 is arranged below the outer axial portion 272a of the inner dust cap 272. The inner axial portion 272c is a tubular portion that extends in a generally axial direction from the inner end of the radial portion 272b with its inner surface contacting the hub axle 30. If desired, the axial portion 272c can be threaded to engage the threads of the hub axle 30.

The outer axial portion 272a of the inner dust cap 272 has a radially outwardly facing surface that is stepped to form an annular abutment portion or surface 272d and a contact portion or surface 272e that contacts the outer sealing member 74 to create a seal therebetween. The annular abutment portion 272d is configured and arranged to prevent axial movement of the outer sealing member 74 along the contact surface 272e of the inner dust cap 272. The abutment portion 272d is preferably an angled abutment surface that is angled approximately thirty degrees relative to a line parallel to the center axis A of the bicycle sealing assembly 240R or 240L.

Still referring to FIG. 21, the inner sealing member 273 is slideably disposed between the outer dust cap 71 (rotational part) and the inner dust cap 272 (fixed part). The inner sealing member 273 is a one-piece, unitary member made of a resilient flexible sealing material such as an elastomeric material having good sealing qualities. Preferably, the inner sealing member 273 is an annular ring shaped member with a uniform cross-sectional profile. In other words, the cross section of the inner sealing member 273 at any point preferably has the same cross section. The inner sealing member 273 has a cross sectional shape that includes a main body portion 273a, an outer sealing flange portion 273b and an inner sealing flange portion 273c. The outer sealing flange portion 273b has an outer seal surface that directly contacts the radially inwardly facing surface of the inner axial portion 71a of the outer dust cap 71 to form a seal therebetween. The inner sealing flange portion 273c has an inner seal surface that directly contacts the radially outwardly facing surface of the inner dust cap 272 (fixed part) to form a seal therebetween. Preferably, the inner sealing member 273 is configured and arranged relative to the outer dust cap 71 and the inner dust cap 272 (fixed part) to float in an axial direction.

Third Embodiment

Figure 22:
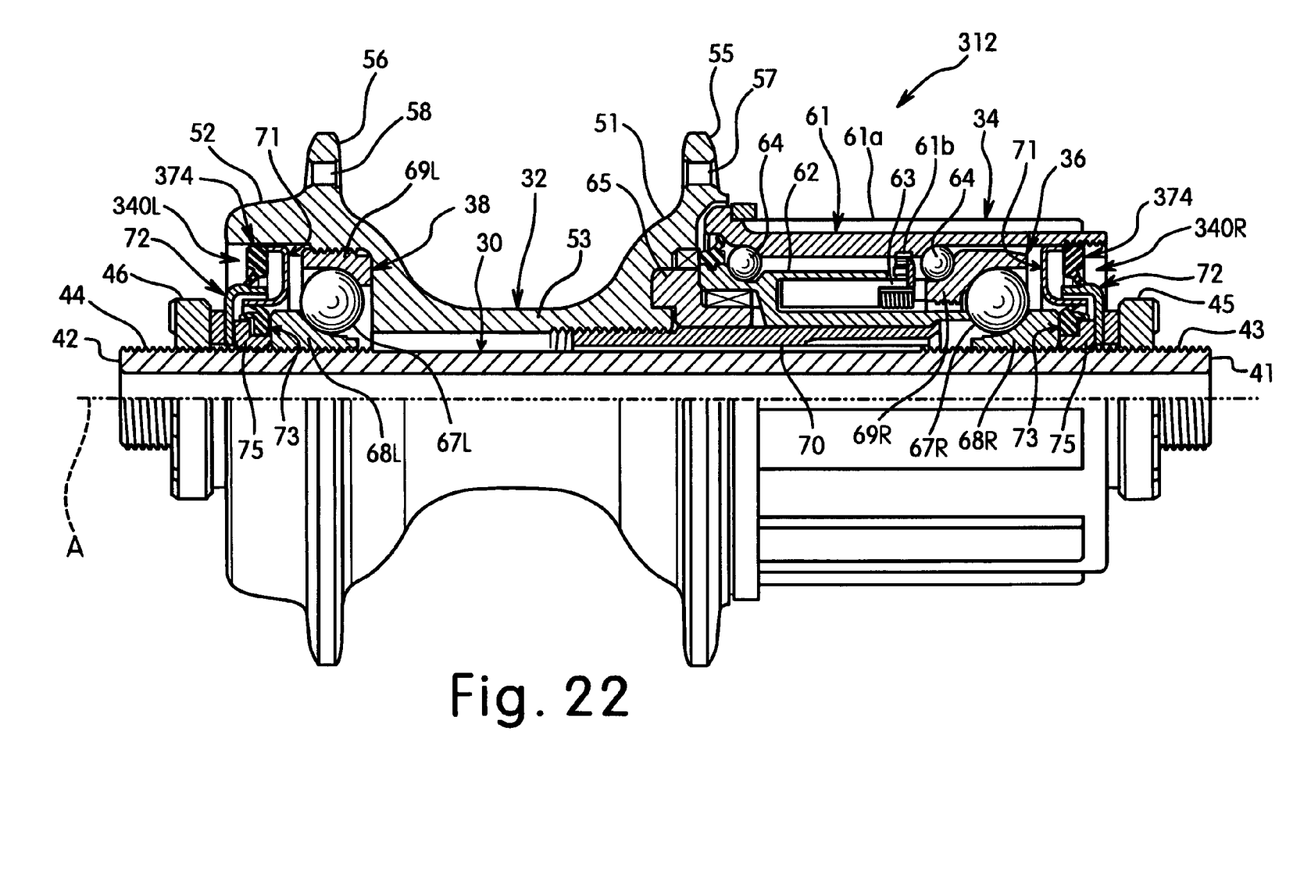
FIG. 22 is a partial cross sectional view of the rear hub illustrating with a modified bicycle hub sealing assembly disposed on each of the ends of the rear hub in accordance with a third embodiment of the present invention.
Figure 23:
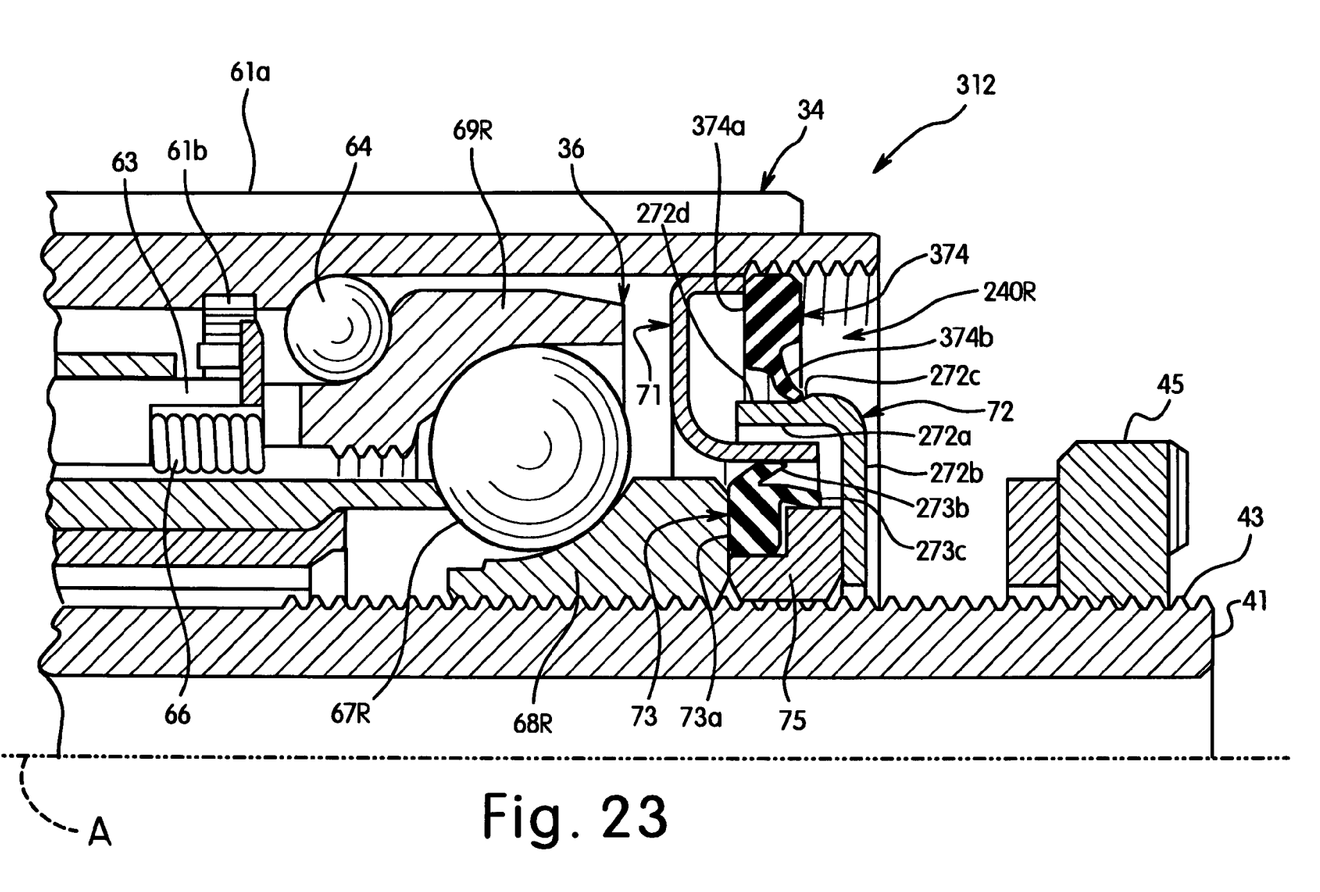
FIG. 23 is an enlarged partial cross sectional view of the right-hand portion of the rear hub illustrated in FIG. 22 with the locking nut partially unthreaded.

Referring now to FIGS. 22 and 23, a rear hub 312 is illustrated in accordance with a third embodiment. In view of the similarity between the first and third embodiments, the parts of the third embodiment that are identical to the parts of the first embodiment will be given the same reference numerals as the parts of the first embodiment. Moreover, the descriptions of the parts of the third embodiment that are identical to the parts of the first embodiment may be omitted for the sake of brevity.

Basically, the rear hub 312 is identical to the rear hub 12, except that the sealing assemblies 40R and 40L of the first embodiment have been replaced with a pair of modified sealing assemblies 340R and 340L in this third embodiment. More specifically, the outer seals 74 have been each replaced with an outer seal 374 in the rear hub 312. In other words, each of the sealing assemblies 340R and 340L of the rear hub 312 includes the first (outer) dust cap 71, the second (inner) dust cap 72, the first (inner) sealing member 73, and the second (outer) sealing member 374. Thus, in this embodiment, the outer seal 374 directly contacts the driving cylinder 61 and the inner dust cap 72 to create a seal therebetween.

Referring to FIG. 22, the outer sealing members 374 are one-piece, unitary members made of a resilient flexible sealing material such as an elastomeric material having good sealing qualities. Preferably, the outer sealing members 374 are annular ring shaped members with a uniform cross-sectional profile. In other words, the cross section of the outer sealing member 374 at any point preferably has the same cross section. Each outer sealing member 374 has a cross sectional shape that includes a main body portion 374a with an inner sealing flange portion 374b as seen in FIG. 23. The main body portion 374a of the second sealing member 374 is press fitted into the driving cylinder 61 on the right hand side of the hub 312 such that an outer seal surface of the main body portion 374a of the outer sealing member 374 contacts the radially inwardly facing surface of the driving cylinder 61 to create a seal therebetween. The main body portion 374a of the second sealing member 374 is press fitted into the second end 52 of the hub shell 32 on the left hand side of the hub 312 such that an outer seal surface of the main body portion 374a of the outer sealing member 374 contacts the radially inwardly facing surface of the second end 52 of the hub shell 32 to create a seal therebetween. The inner sealing flange portions 374b contact a radially outwardly facing portion of a corresponding one of the contact surface 72d of the corresponding inner dust cap 72 such that an inner seal surface of the inner sealing flange portion 374b of the inner sealing member 374 contacts the radially outwardly facing surface of the corresponding outer axial portion 72a of the corresponding inner dust cap 72 to create a seal therebetween. The free end or tip of the inner sealing flange portion 374b contacts the annular abutment portion 72c to prevent axial movement of the second sealing member 374 along the contact surface 72d of the corresponding inner dust cap 72.

As used herein to describe and claim the above embodiments, the following directional terms "inner, outer, forward, rearward, above, downward, vertical, horizontal, below and transverse" as well as any other similar directional terms refer to those directions of a bicycle equipped with the present invention. Accordingly, these terms, as utilized to describe the present invention should be interpreted relative to a bicycle equipped with the present invention. Also the terms of degree such as "substantially", "about" and "approximately" as used herein mean a reasonable amount of deviation of the modified term such that the end result is not significantly changed. These terms should be construed as including a deviation of at least ±5% of the modified term if this deviation would not negate the meaning of the word it modifies.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents.

What is claimed is:

1. A bicycle sealing assembly comprising:
 a first dust cap configured and arranged to be attached to a rotational part of a bicycle;
 a second dust cap configured and arranged to be attached to a fixed part of a bicycle;
 a first sealing member disposed between the first dust cap and either the fixed part or the second dust cap to form a first seal therebetween; and
 a second sealing member disposed between the second dust cap and either the first dust cap or the rotational part to form a second seal therebetween,
 the first and second sealing members both being disposed completely axially inward from an outermost end surface of the second dust cap that faces axially away from a longitudinal center of the fixed part.

2. The bicycle sealing assembly as recited in claim 1, wherein
 the first sealing member contacts a radially inwardly facing surface of the first dust cap; and
 the second sealing member contacts a radially outwardly facing surface of the second dust cap.

3. The bicycle sealing assembly as recited in claim 1, wherein
 the second dust cap includes an abutment portion contacting the second sealing member and arranged to prevent axial movement of the second sealing member along a contact surface of the second dust cap.

4. The bicycle sealing assembly as recited in claim 3, wherein
 the first sealing member includes an outer seal surface contacting the radially inwardly facing surface of the first dust cap.

5. The bicycle sealing assembly as recited in claim 4, wherein
 the first dust cap includes an inner portion extending in an axial direction with the radially inwardly facing surface formed thereon,
 the second dust cap includes an outer portion extending in an axial direction with the radially outwardly facing surface formed thereon, and the inner portion of the first dust cap being arranged to overlap with the outer portion of the second dust cap.

6. The bicycle sealing assembly as recited in claim 5, wherein
the inner portion of the first dust cap is located radially inwardly of the outer portion of the second dust cap.

7. The bicycle sealing assembly as recited in claim 3, wherein
the abutment portion has an angled abutment surface that is angled approximately thirty degrees relative to a line parallel to a center axis of the bicycle sealing assembly.

8. The bicycle sealing assembly as recited in claim 1, wherein
the first sealing member is configured and arranged to contact a seal base nut that forms a portion of the fixed part of the bicycle.

9. The bicycle sealing assembly as recited in claim 1, wherein
the first dust cap includes an inner portion extending in an axial direction; and
the second dust cap includes an outer portion extending in an axial direction and arranged to overlap with the inner portion of the first dust cap.

10. The bicycle sealing assembly as recited in claim 1, wherein
the first sealing member is configured and arranged relative to the first dust cap, the fixed part of the bicycle and the second dust cap to float in an axial direction.

11. The bicycle sealing assembly as recited in claim 1, wherein
the second sealing member includes an outer seal surface contacting the radially inwardly facing surface of the first dust cap and an inner seal surface contacting the radially outwardly facing surface of the second dust cap.

12. The bicycle sealing assembly as recited in claim 1, wherein the first and second dust caps are made of a sheet metal material.

13. The bicycle sealing assembly as recited in claim 1, wherein
the first sealing member contacts the first dust cap and the fixed part to form the first seal therebetween.

14. The bicycle sealing assembly as recited in claim 13, wherein
the second sealing member contacts the second dust cap and the first dust cap to form the second seal therebetween.

15. The bicycle sealing assembly as recited in claim 1, wherein
the second sealing member contacts the second dust cap and the first dust cap to form the second seal therebetween.

16. The bicycle sealing assembly as recited in claim 1, wherein
the first sealing member contacts the first dust cap and second dust cap to form the first seal therebetween.

17. A bicycle sealing assembly comprising:
a first dust cap configured and arranged to be attached to a rotational part of a bicycle;
a second dust cap configured and arranged to be attached to a fixed part of a bicycle;
a first sealing member disposed between the first dust cap and either the fixed part or the second dust cap to form a first seal therebetween; and
a second sealing member disposed between the second dust cap and either the first dust cap or the rotational part to form a second seal therebetween,
the second sealing member being press fitted on the first dust cap or the rotational part.

18. A bicycle sealing assembly comprising:
a first dust cap configured and arranged to be attached to a rotational part of a bicycle;
a second dust cap configured and arranged to be attached to a fixed part of a bicycle;
a first sealing member disposed between the first dust cap and either the fixed part or the second dust cap to form a first seal therebetween; and
a second sealing member disposed between the second dust cap and either the first dust cap or the rotational part to form a second seal therebetween,
the second sealing member contacting the second dust cap and the rotational part to form the second seal therebetween.

19. The bicycle sealing assembly as recited in claim 18, wherein
the first sealing member contacts the first dust cap and second dust cap to form the first seal therebetween.

20. A bicycle component comprising:
a fixed part with a center axis;
a rotatable part having an inner tubular surface forming a central passage, the fixed part being rotatably disposed within the central passage of the rotatable part; and
a bicycle sealing assembly disposed between the fixed part and the rotatable part, the bicycle sealing assembly including
a first dust cap coupled to the rotatable part,
a second dust cap coupled to the fixed part,
a first sealing member disposed between the first dust cap and either the fixed part or the second dust cap to form a first seal therebetween, and
a second sealing member disposed between the second dust cap and either the first dust cap or the rotatable part to form a second seal therebetween,
the first and second sealing members both being disposed completely axially inward from an outermost end surface of the second dust cap that faces axially away from a longitudinal center of the fixed part.

21. The bicycle component as recited in claim 20, wherein the fixed part is a hub axle, and the rotatable part is a hub shell.

22. The bicycle component as recited in claim 20, wherein
the first sealing member contacts a radially inwardly facing surface of the first dust cap; and
the second sealing member contacts a radially outwardly facing surface of the second dust cap.

23. The bicycle component as recited in claim 20, wherein
the second dust cap includes an abutment portion contacting the second sealing member and arranged to prevent axial movement of the second sealing member along a contact surface of the second dust cap.

24. The bicycle component as recited in claim 23, wherein
the first sealing member includes an outer seal surface contacting the radially inwardly facing surface of the first dust cap.

25. The bicycle component as recited in claim 24, wherein
the first dust cap includes an inner portion extending in an axial direction with the radially inwardly facing surface formed thereon,
the second dust cap includes an outer portion extending in an axial direction with the radially outwardly facing surface formed thereon, and
the inner portion of the first dust cap being arranged to overlap with the outer portion of the second dust cap.

26. The bicycle component as recited in claim 25, wherein the inner portion of the first dust cap is located radially inwardly of the outer portion of the second dust cap.

27. The bicycle component as recited in claim 23, wherein the abutment portion has an angled abutment surface that is angled approximately thirty degrees relative to a line parallel to a center axis of the bicycle sealing assembly.

28. The bicycle component as recited in claim 20, wherein the first sealing member is configured and arranged to contact a seal base nut that forms a portion of the fixed part of the bicycle.

29. The bicycle component as recited in claim 20, wherein the first dust cap includes an inner portion extending in an axial direction; and
the second dust cap includes an outer portion extending in an axial direction and arranged to overlap with the inner portion of the first dust cap.

30. The bicycle component as recited in claim 20, wherein the first sealing member is configured and arranged relative to the first dust cap, the fixed part of the bicycle and the second dust cap to float in an axial direction.

31. The bicycle component as recited in claim 20, wherein the second sealing member includes an outer seal surface contacting the radially inwardly facing surface of the first dust cap and an inner seal surface contacting the radially outwardly facing surface of the second dust cap.

32. The bicycle component as recited in claim 20, wherein the first and second dust caps are made of a sheet metal material.

33. The bicycle sealing assembly as recited in claim 20, wherein
the first sealing member contacts the first dust cap and the fixed part to form the first seal therebetween.

34. The bicycle sealing assembly as recited in claim 33, wherein
the second sealing member contacts the second dust cap and the first dust cap to form the second seal therebetween.

35. The bicycle sealing assembly as recited in claim 20, wherein
the second sealing member contacts the second dust cap and the first dust cap to form the second seal therebetween.

36. The bicycle sealing assembly as recited in claim 20, wherein
the first sealing member contacts the first dust cap and second dust cap to form the first seal therebetween.

37. A bicycle component comprising:
a fixed part with a center axis;
a rotatable part having an inner tubular surface forming a central passage, the fixed part being rotatably disposed within the central passage of the rotatable part; and
a bicycle sealing assembly disposed between the fixed part and the rotatable part, the bicycle sealing assembly including
a first dust cap coupled to the rotatable part,
a second dust cap coupled to the fixed part,
a first sealing member disposed between the first dust cap and either the fixed part or the second dust cap to form a first seal therebetween, and
a second sealing member disposed between the second dust cap and either the first dust cap or the rotatable part to form a second seal therebetween,
the fixed part being a hub axle, and the rotatable part being a freewheel.

38. A The bicycle component comprising:
a fixed part with a center axis;
a rotatable part having an inner tubular surface forming a central passage, the fixed part being rotatably disposed within the central passage of the rotatable part; and
a bicycle sealing assembly disposed between the fixed part and the rotatable part, the bicycle sealing assembly including
a first dust cap coupled to the rotatable part,
a second dust cap coupled to the fixed part,
a first sealing member disposed between the first dust cap and either the fixed part or the second dust cap to form a first seal therebetween, and
a second sealing member disposed between the second dust cap and either the first dust cap or the rotatable part to form a second seal therebetween,
the second sealing member being press fitted on the first dust cap or the rotational part.

39. A bicycle sealing assembly comprising:
a fixed part with a center axis;
a rotatable part having an inner tubular surface forming a central passage, the fixed part being rotatably disposed within the central passage of the rotatable part; and
a bicycle sealing assembly disposed between the fixed part and the rotatable part, the bicycle sealing assembly including
a first dust cap coupled to the rotatable part,
a second dust cap coupled to the fixed part,
a first sealing member disposed between the first dust cap and either the fixed part or the second dust cap to form a first seal therebetween, and
a second sealing member disposed between the second dust cap and either the first dust cap or the rotatable part to form a second seal therebetween,
the second sealing member contacting the second dust cap and the rotational part to form the second seal therebetween.

40. The bicycle sealing assembly as recited in claim 39, wherein
the first sealing member contacts the first dust cap and second dust cap to form the first seal therebetween.

* * * * *